(12) United States Patent
Monson et al.

(10) Patent No.: US 7,686,247 B1
(45) Date of Patent: Mar. 30, 2010

(54) VEHICLE RECOVERY

(75) Inventors: Robert J. Monson, St. Paul, MN (US); Steven H. Ernst, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 386 days.

(21) Appl. No.: 11/644,141

(22) Filed: Dec. 22, 2006

(51) Int. Cl.
*B64F 1/02* (2006.01)

(52) U.S. Cl. .................................. 244/110 R

(58) Field of Classification Search ............. 244/110 R, 244/110 E, 110 F, 110 C, 100 A, 114 R, 116, 244/139, 905; 114/241, 258, 261, 262; 472/134, 472/135; 182/137
See application file for complete search history.

(56) References Cited

U.S. PATENT DOCUMENTS

| | | | | |
|---|---|---|---|---|
| 3,851,730 A | * | 12/1974 | Scurlock | 182/137 |
| 4,653,706 A | * | 3/1987 | Ragiab | 244/110 E |
| 4,753,400 A | | 6/1988 | Reuter et al. | |
| 4,824,282 A | | 4/1989 | Waldecker | |
| 5,720,678 A | | 2/1998 | Korthauer | |
| 5,865,693 A | | 2/1999 | Johnson | |
| 5,871,214 A | * | 2/1999 | Hummel | 273/348.4 |
| 5,937,586 A | * | 8/1999 | Scherba | 472/134 |
| 6,511,382 B1 | * | 1/2003 | Ochi | 472/134 |
| 7,097,137 B2 | | 8/2006 | McDonnell | |
| 7,118,487 B2 | | 10/2006 | Turcot | |
| 2004/0083550 A1 | * | 5/2004 | Graebe, Jr. | 5/654 |
| 2004/0177799 A1 | * | 9/2004 | Andersson et al. | 114/382 |
| 2005/0187043 A1 | * | 8/2005 | Miller et al. | 473/415 |
| 2005/0279160 A1 | * | 12/2005 | Nordhoff | 73/146 |
| 2006/0073748 A1 | * | 4/2006 | Boujon | 441/40 |
| 2008/0035903 A1 | * | 2/2008 | Newton | 256/1 |

OTHER PUBLICATIONS

Dickard, H. E. Mini-RPV Recovery System Conceptual Study. 1977. pp. 118-124 pertinent.*
Phillips, K. Alternate Aquila Recovery System Demonstration Recovery System Flight Test. 1976. pp. 1-6 pertinent.*

* cited by examiner

*Primary Examiner*—Michael Carone
*Assistant Examiner*—Richard R Green
(74) *Attorney, Agent, or Firm*—Brooks, Cameron & Huebsch, PLLC (57) ABSTRACT

The present disclosure includes various apparatus and method embodiments for vehicle recovery. One embodiment includes at least one inflatable member having a target area for impact of a vehicle thereon and wherein the at least one inflatable member is inflated with a fluid provided by an inflation source.

21 Claims, 9 Drawing Sheets

VEHICLE RECOVERY

FIELD OF THE INVENTION

The present disclosure generally relates to vehicle recovery. And, in particular, the present disclosure relates to inflatable structures and methods for vehicle recovery.

BACKGROUND

Recovering vehicles, for example, where space for recovery may be limited, while preventing damage to the vehicle and/or its payload, which can include valuable electronic components and/or information stored thereon, is desirable in many instances. Such vehicles, which can include various unmanned aerial vehicles (UAVs) among other air, land, and/or water vehicles, can often be reused. As such, safe recovery of such vehicles can provide cost, manufacturing, supply, and/or materials savings, among other benefits.

Some current methods of recovery of UAVs include using parachutes, parafoils, nets, cable arresting devices, or a combination thereof. Some such methods and/or devices can be complicated, time consuming, difficult to erect/teardown, and/or can be difficult to integrate in small areas (e.g., on a ship deck having limited area).

SUMMARY

Embodiments of the present disclosure provide various methods and apparatuses for vehicle recovery. Various embodiments provide for recovery of an aerial vehicle such as an unmanned aerial vehicle (UAV) without causing damage to the vehicle and/or its payload. In various embodiments, the apparatus can have a small footprint, can be portable, and can be rapidly inflated to provide a vehicle recovery area.

Such embodiments allow a user to retrieve a vehicle in a location that is remote from a landing strip or military base. Embodiments, for example, can be inflated using a portable air compressor that is powered from a car battery, or using a compressed fluid canister, among other implementations.

In some embodiments, the apparatus can include a number of inflatable members that define a vehicle target area (e.g., an area to receive a vehicle impact).

The inflation can be accomplished using any suitable fluid. For example, air or other gases can be used to inflate such embodiments. In various embodiments, liquids, such as water can be used to accomplish the inflation.

The inflatable members can be made of various materials including various nylon, plastic, and/or rubber materials. In some embodiments, the material can be coated to provide enhanced durability and/or inflation properties, among other characteristics that may be suitable to an inflatable apparatus. For example, one suitable coating may be silicone. In some embodiments, the inflatable material can have a weight of around 1.0-2.0 ounces per square foot.

The number of inflatable members can be inflated with a fluid (e.g., a gas or liquid) provided by a number of inflation sources. Example inflation sources include a fan, blower, fluid pump, gas generator, or a compressed fluid canister (e.g., pressurized), among other inflation sources.

In some embodiments, the inflation source can be an explosive source such as that used to inflate an airbag in an automobile. In some such embodiments, a solid propellant can be ignited, which burns to create a large volume of gas to inflate the bag. Such propellants can rapidly burn to inflate an inflatable member quickly, in some embodiments.

In addition to fluid movement components and propellants, in some embodiments, a chemical reaction can be used to produce the inflation of an inflatable member. For example, a chemical reaction can be used to produce a gas or a fluid, such as foam or a liquid that can inflate an inflatable member.

In some embodiments, the inflation source can be connected to a power source and/or may be battery operated. In some embodiments, the inflation source can be a pressure regulated compressed fluid (e.g., gas) source. The inflation source can, for example, be used to provide a pressure within the apparatus to maintain the inflatable members in an inflated state until a vehicle impacts the target area.

In some embodiments, the power source can be used to provide the power to actuate the opening and/or closing of a vent/valve, ignite a propellant, or initiate a chemical reaction. Any suitable power source for providing such functionality can be utilized in various embodiments of the present disclosure.

In various embodiments, the pressure suitable to maintain the inflatable members in the inflated state can, for example, be about 3-5 pounds per square inch (psi). The pressure suitable to maintain the inflatable members in the inflated state can depend on factors such as the type of material being inflated, weight of the material being inflated, the size of the members, and/or configuration of the members, among other factors.

In various embodiments, the apparatus can include a number of deflation vents through which the fluid in the apparatus can be exhausted when a vehicle (e.g., an UAV) impacts the target area. The deflation vents can be located on a number of the inflatable members.

In some embodiments, a number of deflation vents can remain in an open state while the inflatable members are in an inflated state. That is, the vents can be configured such that a suitable pressure is maintained within the inflatable members when the apparatus includes a number of open vents. Upon a vehicle impact to the target area, the fluid within the inflatable members can be exhausted through the deflation vents such that the inflatable members collapse around the vehicle, and be used to cushion the vehicle as it is recovered.

In some embodiments, the vehicle can be captured within the deflating material (e.g., like inside a closing catcher's mitt). For instance, if the target forms a "C" shaped cross-section, the vehicle can impact the inner back side of the "C" and the vehicle can be sandwiched between a top portion of the "C" shape and a bottom portion (e.g., a base). An inflatable base member can be provided in various embodiments of the present disclosure. In some embodiments, the inflatable member that is provided as a base, can provide a cushioning functionality which may reduce damage to the vehicle upon recovery. For example, a vehicle may impact the target and tumble downward or bounce off the target among other actions. The base can provide a cushion upon which the vehicle can rest after contacting the target.

In various embodiments, the vehicle recovery apparatus can include a support. The support can be inflatable, in some embodiments, and can, for example, be attached to, and in fluid communication with, a number of the inflatable members. For instance, in some embodiments, the inflatable support can be attached to both an inflatable member and the inflatable base.

In various embodiments, the apparatus can include netting within at least a portion of the target area and attached to at least one inflatable member. In such embodiments, the netting provide a cushioning functionality, in which the netting cushions the impact from the vehicle. In some embodiments, the netting can be used to capture the vehicle.

In some embodiments, the apparatus can include a capture mechanism. For instance, in such embodiments, a vehicle (e.g., an UAV) can include a capture component (e.g., capture component 141 shown in FIG. 1A) to releasably attach with a corresponding capture component of at least one of the number of inflatable members and/or netting associated therewith (e.g., capture component 343 shown in FIG. 3A). As an example, an UAV can have a hook and loop fastener material on its leading edges which can releasably attach to a corresponding hook and loop fastener material located on an inflatable member and/or netting of the target area. Such positive capture mechanisms can reduce and/or prevent damage to a vehicle during capture by reducing movement after the vehicle impacts the target area.

In some embodiments, the apparatus can include at least two inflatable members in fluid communication with the inflatable base and defining the vehicle target area. In such embodiments, the at least two inflatable members can include vertical members (e.g., inflatable columns) spaced a distance apart.

The spacing between the inflatable members can provide for air flow around the vertical columns which can reduce wind effects on the columns. In some embodiments, the vertical columns can be arranged in a horizontal array.

In various embodiments, the vertical columns may be attached at an upper portion via a tether or other attachment mechanism. In some embodiments, netting may be attached between the vertical columns. In various embodiments, each of the vertical inflatable members can include a first deflation vent at a first end and a second deflation vent at a second end. In such embodiments, the first and second deflation vents can provide for rapid deflation upon a vehicle impact by reducing or preventing air from being sealed in the inflatable members during capture and recovery. The deflation vents can be configured in various manners.

One example of a deflation vent can include a flap releasably attached over an aperture in the apparatus (e.g., an aperture in an inflatable member or the inflatable base that provides fluid communication between an interior and an exterior thereof). In such embodiments, the flap can be a flap of material that remains over the aperture until the vehicle impact to the target area occurs.

In such embodiments, the flap can be releasably attached over the aperture in various manners. For example, a fastener such as a hook and loop fastener (e.g., Velcro) or a number of magnets can be used to maintain the vent in a closed position prior to the vehicle impact.

In such embodiments, an increased pressure within the apparatus due to the vehicle impact can cause the flap to detach as the fluid within the apparatus is exhausted through the aperture. Embodiments of the present disclosure are not limited to a particular type of deflation vent.

In various embodiments, the apparatus can include a switch controlled by at least one of the number of deflation vents. For instance, an electrical or mechanical switch can be coupled to a vent and operated (e.g., opened and closed) based on the state of the vent (e.g., whether the vent is opened or closed).

In such embodiments, operation of the switch can control the inflation source. For example, in embodiments in which the vent includes a flap over an aperture as described above, physical release of the flap from over the aperture can change the state of the switch.

The state change of the switch can cause the inflation source to be shutdown. In various embodiments, shutting down the inflation source upon impact of the vehicle to the target area can be desirable and/or beneficial.

For example, once a vehicle has impacted the apparatus, further inflation of the apparatus can cause damage to the vehicle and/or its payload. Therefore, in various embodiments, the fluid within the apparatus is exhausted through the deflation vents upon impact of the vehicle and the apparatus remains in a deflated state until the vehicle is recovered.

In various embodiments of the present disclosure, the apparatus can include a number of wired and/or wireless sensors. For instance, in some embodiments, the apparatus can include a pressure sensor on at least one of the number of inflatable members and/or on the inflatable base.

In such embodiments, the opening or closing of a number of deflation vents can be based on a pressure change detected by the pressure sensor. For example, a detected rise in pressure (e.g., due to a vehicle impact) within a number of the inflatable members can trigger the opening of a number of deflation vents.

In various embodiments, the inflation source can be controlled based on the pressure sensor information. For instance, the amount of fluid provided by the inflation source can be adjusted to maintain a particular pressure within the apparatus and/or a number of its inflatable members. In such embodiments, a detected rise in pressure may also trigger a shutdown of the inflation source.

DETAILED DESCRIPTION

Embodiments of the present disclosure include various methods, apparatuses, and systems for vehicle recovery. Various embodiments of the present disclosure will now be described in relation to the accompanying drawings, which will at least assist in illustrating the various features of the various embodiments.

Figure 1A:
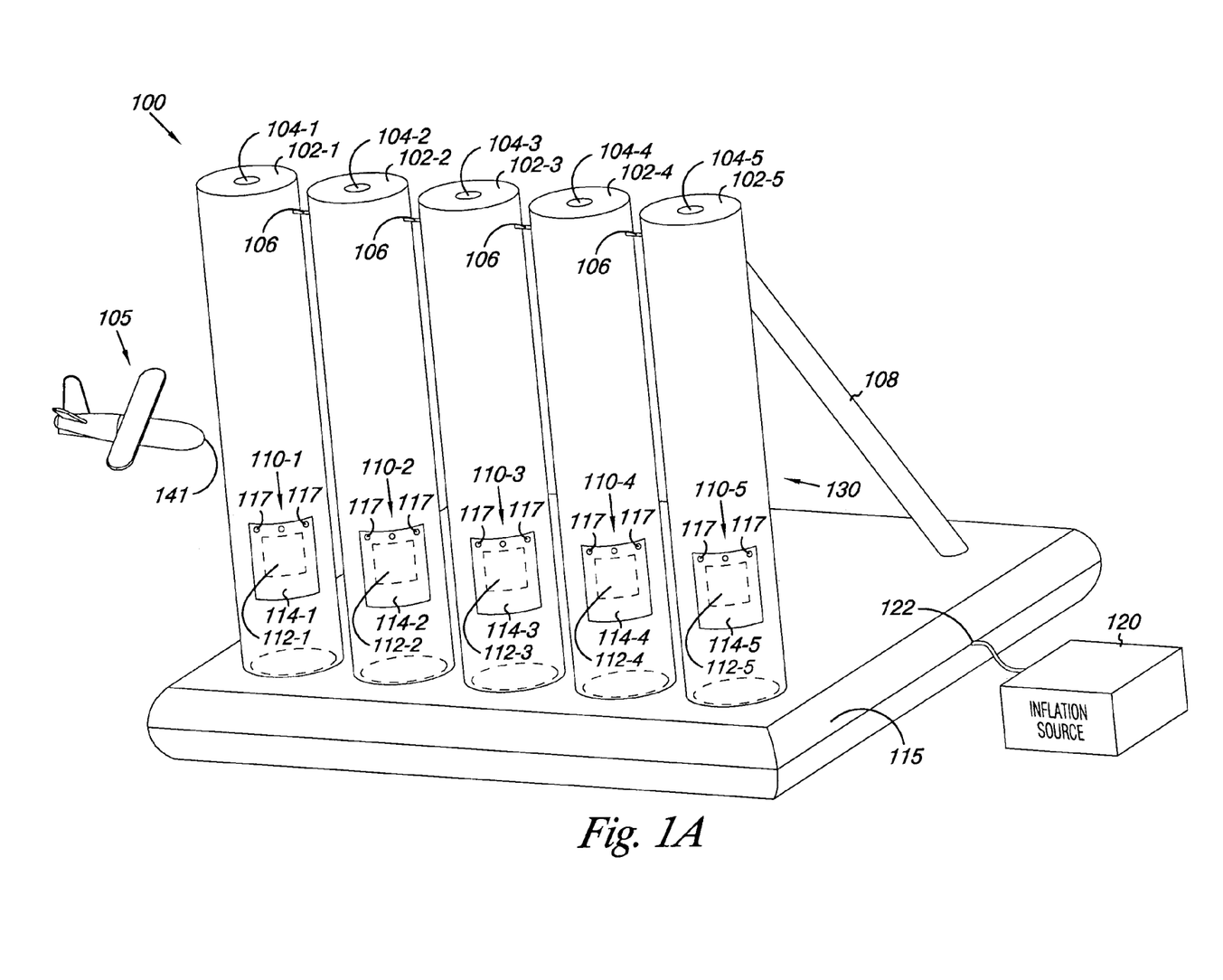
FIG. 1A illustrates a vehicle recovery apparatus according to an embodiment of the present disclosure.

FIG. 1A illustrates a vehicle recovery apparatus according to an embodiment of the present disclosure. In the embodiment illustrated in FIG. 1A, the apparatus 100 includes a number of inflatable members 102-1, 102-2, 102-3, 102-4, and 102-5.

Although five inflatable members are shown in the embodiment of FIG. 1A, embodiments can include more or fewer than five inflatable members. The inflatable members 102-1 to 102-5 define a vehicle target area 130 and are in fluid communication with an inflatable member provided as an inflatable base 115. In some embodiments, the base can be a non-inflated member.

The apparatus 100 can be inflated with fluid (e.g., gas) provided at an inflation point 122 by an inflation source 120. The apparatus can include a number of inflation points (e.g., one way valves) and more than one inflation source can be used to inflate the apparatus.

In the embodiment of FIG. 1A, the inflatable members 102-1 to 102-5 are shown as vertical inflatable columns spaced a distance apart to form the target area 130. In such an embodiment, each of the inflatable members 102-1 to 102-5 includes a respective first deflation vent 104-1, 104-2, 104-3, 104-4, and 104-5 located at a first end and a respective second deflation vent 110-1, 110-2, 110-3, 110-4, and 110-5 located at a second end.

The deflation vents 104-1 to 104-5 can be openings in the tops of the columns or at other locations thereon. The deflation vents 104-1 to 104-5 can be sized so as to maintain an inflation pressure (e.g., about 3-10 pound per square inch (psi), in some embodiments) within the columns to maintain the columns in the inflated state.

The pressure sufficient to maintain the columns in the inflated state can depend on various factors such as the material used to form the columns, among other factors. The inflatable base 115 and/or inflatable members 102-1 to 102-5 can be made of various materials including various nylon fabrics which may have a coating such as a silicone coating thereon.

In various embodiments, the columns are made of a nylon fabric having a weight of about 1.0-2.0 ounces per square foot. Embodiments of the present disclosure are not limited to a particular type of column material or to a particular inflation pressure maintained in the columns.

In the embodiment of FIG. 1A, the vertical columns 102-1 to 102-5 are attached near a top end via attachment members 106 (e.g., a nylon tether or other attachment member). In various embodiments, any suitable structure for providing support for the vertical columns and/or preventing the space between the columns from becoming too large can be utilized.

Figure 4A:
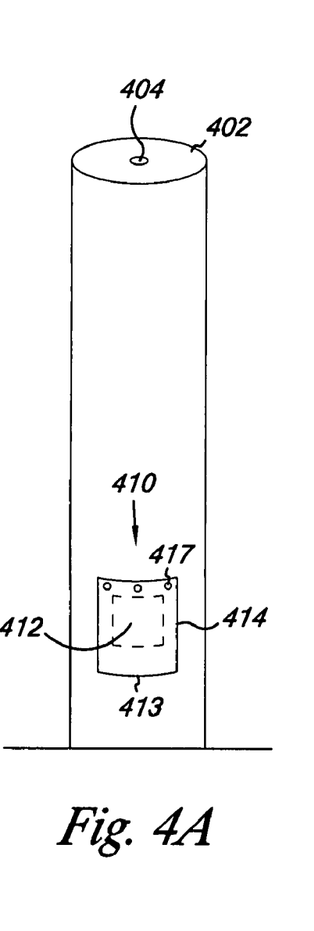
FIG. 4A illustrates an inflatable member having a number of vents according to an embodiment of the present disclosure.
Figure 4B:
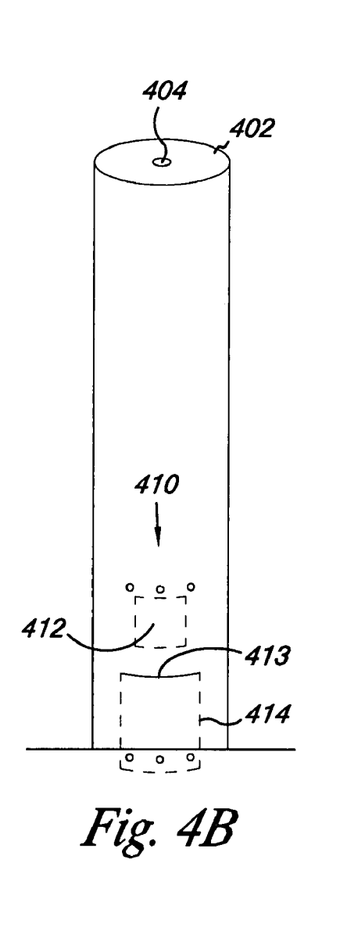
FIG. 4B illustrates the inflatable member of FIG. 4A having a vent in an open state according to an embodiment of the present disclosure.

In the embodiment illustrated in FIG. 1A, the deflation vents 110-1 to 110-5 can be maintained in a closed state as shown, and can be opened to exhaust the fluid in the apparatus when a vehicle 105 (e.g., an UAV) impacts target area 130. An example of a deflation vent such as 110-1 to 110-5 in an open state and a closed stated is shown in the embodiment of FIGS. 4A-4B.

In the embodiment of FIG. 1A, the deflation vents 110-1 to 110-5 include a flap 114-1, 114-2, 114-3, 114-4, and 114-5 attached over an aperture 112-1, 112-2, 112-3, 112-4, and 112-5 in columns 102-1 to 102-5. In some embodiments, the number of flaps can be releasably attached to over the aperture. For example, the flaps 114-1 to 114-5 in the embodiment of FIG. 1A can be releasably attached at attachment points 117.

In some embodiments, the flaps can be attached over the apertures at the attachment points by using hook and loop fasteners on opposing surfaces of the column and flap. Various other fastener types, such as magnets or adhesives, can be used to attach the flaps over the apertures. A pressure increase due to the impact of vehicle 105 can force the release of a number of flaps 114-1 to 114-5, such as at attachment points 117, such that the fluid within a number of the columns is exhausted through a number of apertures 112-1 to 112-5.

In the embodiment illustrated in FIG. 1A, the fluid within columns 102-1 to 102-5 can be exhausted through both vents 104-1 to 104-5 and vents 110-1 to 110-5 upon a vehicle impact. In such embodiments, the use of vents located near both ends of the inflatable member (e.g., column 102-1 to 102-5) can increase the deflation/exhaustion rate and/or can reduce or prevent fluid from being sealed within the inflatable members during vehicle recovery.

Embodiments of the present disclosure are not limited to the configuration shown in FIG. 1A. For example, in various embodiments, a number of the inflatable members 102-1 to 102-5 may include more or fewer than two deflation vents, may be shaped differently, and/or may include portions made from different materials, among other differences.

For example, in some embodiments, the number of the inflatable members may include only one type of deflation vent (e.g., 104-1 or 110-1). In some embodiments, a number of the inflatable members may not include any deflation vents.

In some embodiments, an inflatable base 115 may include a number of deflation vents. In such embodiments, the deflation vents of the base 115 can open to further exhaust the fluid in the apparatus 100 as the base 115 absorbs and/or cushions the vehicle 105 as it falls from the target area 130. Embodiments of the present disclosure may include any suitable type of deflation vent and/or exhaust valve that can be used to rapidly deflate a vehicle recovery apparatus such as apparatus 100.

The embodiment of FIG. 1A shows the vertical inflatable members 102-1 to 102-5 arranged in a horizontal array forming target area 130 (e.g., a wall or barrier). In some embodiments, the vertical inflatable members that are closer to the edges of the target area 130 (e.g., 102-1 and 102-5) can be nearer to the front of the apparatus 100 than the vertical members closer to the center of the target area 130 (e.g., 104-2 to 102-4) such that the target area 130 has a convex shape.

In the embodiment of FIG. 1A, the inflatable columns 102-1 to 102-5 all have the same size and shape. However, the size and shape of the inflatable members and/or target area can vary.

Some example heights of the vertical columns 102-1 to 102-5 include heights between about 20 feet and about 30 feet. Some example widths of the columns include widths between about 2 feet and about 5 feet.

The spacing between the columns can, for example, be between about 1 foot and 3 feet. In various embodiments, the target area 130 can have an area of between about 400-900 square feet (e.g., about 20-30 square feet by about 20-30 square feet). However, the size and/or spacing of the columns and/or the size of the target area can depend on factors such as the size, weight, and/or type of vehicle that is to be captured and/or recovered, among other factors and, therefore such characteristics should not be considered limiting on the various embodiments of the present disclosure.

In the embodiment illustrated in FIG. 1A, the apparatus 100 includes a support 108. In some embodiments, the support 108 can be an inflatable support and can be attached to, and in fluid communication with, inflatable member 102-5 and/or inflatable base 115. In various embodiments, the apparatus may include more or less than one support. For example, in some embodiments, each inflatable member may have a support attached thereto.

As previously mentioned, the vehicle 105 and the apparatus 100 can include a number of capture mechanisms that can facilitate safe capture and recovery. For instance, the vehicle may include a capture component such as hook and loop fastener material attached to a leading edge or edges of the vehicle (e.g., the portions of the vehicle that contact target area 130 upon impact).

In such embodiments, the apparatus (e.g., the inflatable members 102-1 to 102-5 and/or netting therebetween) can include a capture component such as a corresponding hook and loop fastener material. Upon an impact of the vehicle with the apparatus, the corresponding capture components can attach with each other to reduce movement of the vehicle which can prevent damage thereto. When mechanisms like hook and loop are utilized, this attachment can be releasable.

Figure 1B:
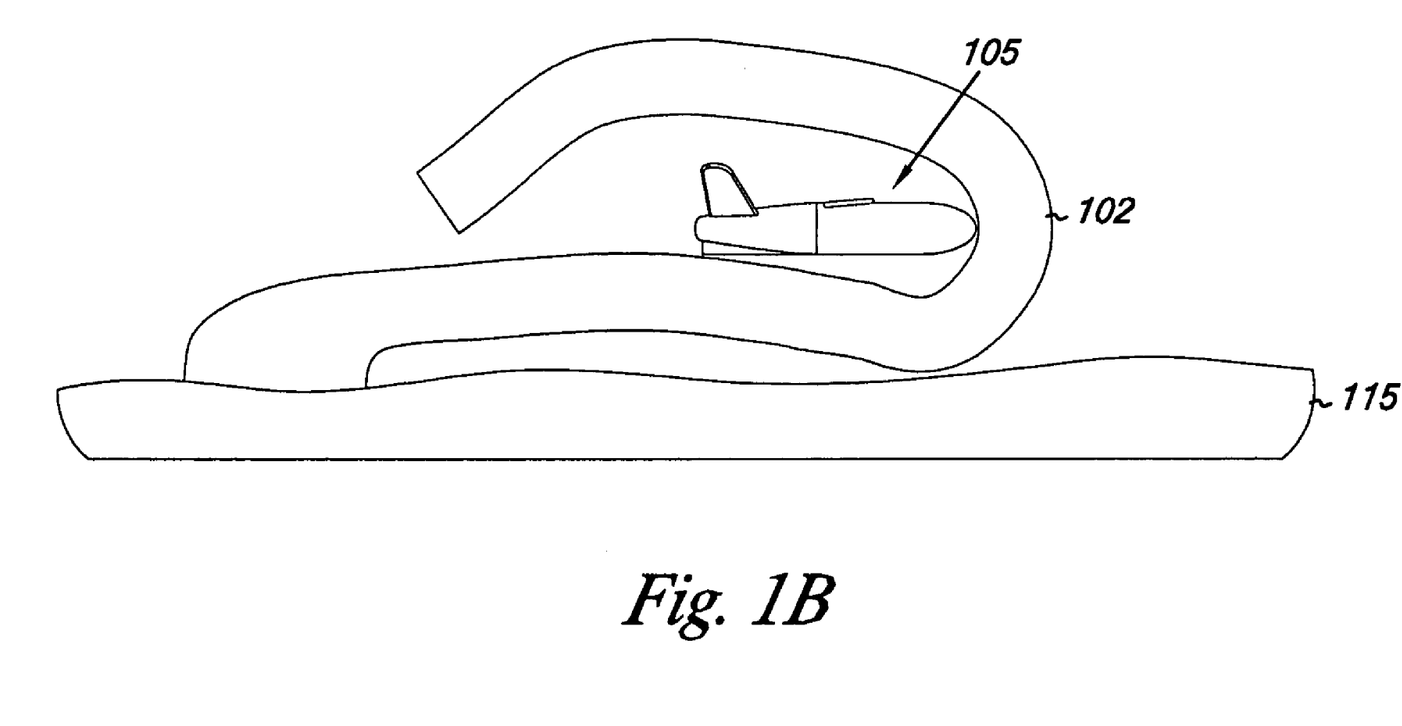
FIG. 1B illustrates a vehicle recovery apparatus according to an embodiment of the present disclosure.

FIG. 1B illustrates a vehicle recovery apparatus according to an embodiment of the present disclosure. The embodiment illustrated in FIG. 1B shows an apparatus (e.g., apparatus 100 shown in FIG. 1A) in a partially deflated state.

That is, the embodiment illustrated in FIG. 1B illustrates the recovery apparatus after the vehicle 105 has impacted the target area (e.g., target area 130 shown in FIG. 1A). In such embodiments, the inflatable member 102 (e.g., a vertical column such as 102-1 to 102-5) has collapsed around the vehicle 105 as the fluid within the apparatus has been exhausted through a number of deflation vents (e.g., deflation vents 104-1 to 104-5 and/or 110-1 to 110-5 shown in FIG. 1A).

In some embodiments, a base 115 can provide additional cushioning or can provide the bottom surface of a capture area within which the vehicle 105 can be captured. In the embodiment of FIG. 1B, the inflatable member 102 provides both the top and the bottom surfaces within which the vehicle 105 is captured.

Figure 1C:
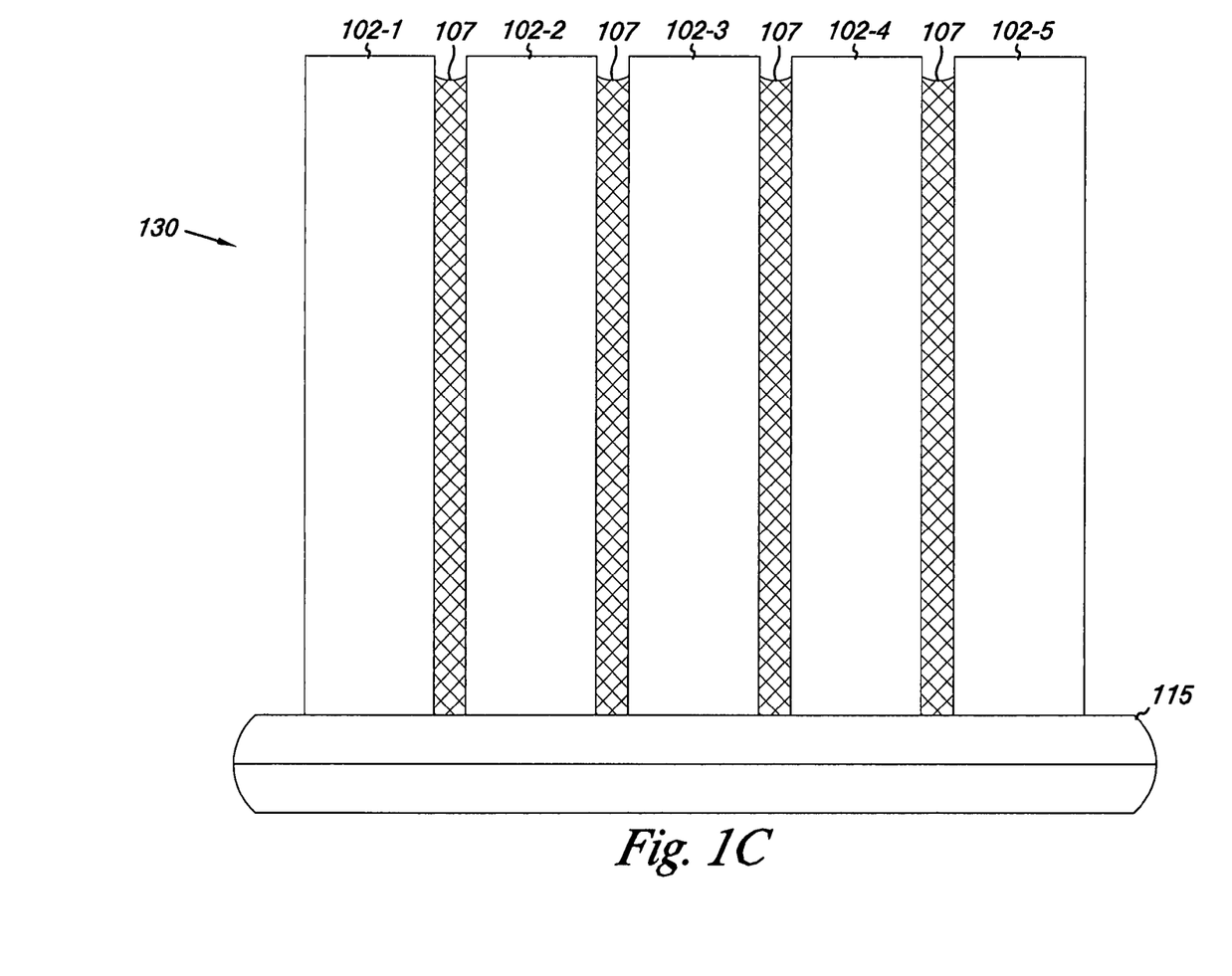
FIG. 1C illustrates a vehicle recovery apparatus according to an embodiment of the present disclosure.

FIG. 1C illustrates a vehicle recovery apparatus according to an embodiment of the present disclosure. The embodiment illustrated in FIG. 1C includes a number of inflatable members 102-1, 102-2, 102-3, 102-4, and 102-5 in fluid communication with an inflatable base 115.

The inflatable members 102-1 to 102-5 are spaced a distance apart and define the target area 130. In some embodiments, the spacing between the inflatable members may be about one half of the width of the inflatable members. The size of and/or the spacing between the inflatable members 102-1 to 102-5 should not be viewed as limiting characteristics of the embodiments of the present disclosure.

In various embodiments, the apparatus can include a netting material attached to a number of the inflatable members within at least a portion of the target area. In the embodiment of FIG. 1C, the inflatable members are inflatable vertical columns having netting 107 attached therebetween. In such embodiments, the netting can provide the functionality of the attachment members (e.g., members 106 of the embodiment of FIG. 1A), among other functions.

The netting can be nylon netting or netting made of other suitable materials that can hold the components of the target together or provide a capture portion of the target among other functions. The netting can also have any suitable mesh size. In some embodiments, the mesh size of netting 107 can be, for example, about 10 cm by 10 cm or larger in order to facilitate air flow between the columns to reduce wind effects on the vehicle recovery apparatus. Other larger or smaller mesh sizes may also provide such functionality, among other functions.

Figure 2:
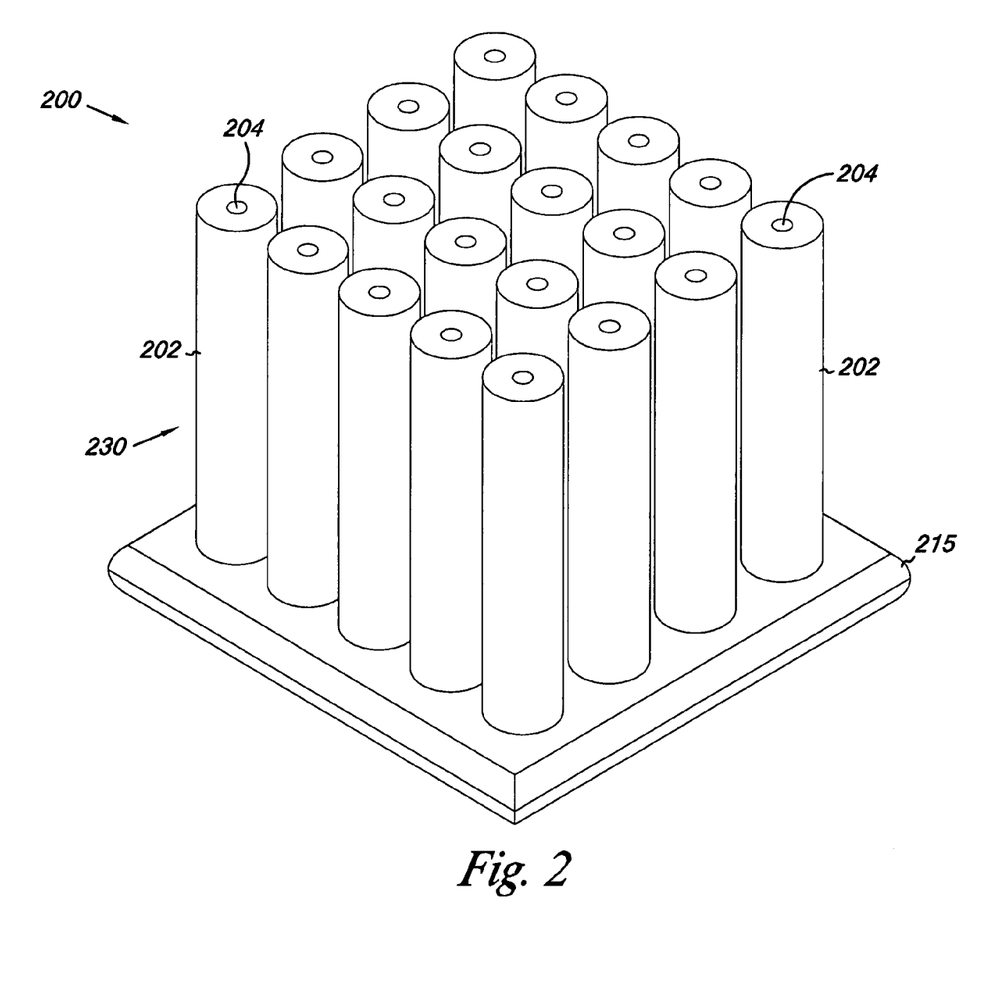
FIG. 2 illustrates a vehicle recovery apparatus according to an embodiment of the present disclosure.

FIG. 2 illustrates a vehicle recovery apparatus according to an embodiment of the present disclosure. In the embodiment illustrated in FIG. 2, the apparatus 200 includes a number of inflatable members 202 in fluid communication with inflatable an inflatable base 215.

In such embodiments, the inflatable members 202 can be vertical columns spaced a distance apart. The inflatable columns 202 can be used to define a number of vehicle target areas 230.

In the embodiment illustrated in FIG. 2, the number of vertical columns 202 can be arranged in rows and columns in a four-sided array. In such embodiments, each side of the array can be a vehicle target area. That is, a vehicle such as an UAV can impact any one of the four sides of the apparatus 200 and can be recovered thereby.

In the embodiment illustrated in FIG. 2, each of the inflatable vertical columns 202 includes a deflation vent 204 (e.g., deflation vents 104-1 to 104-5 described in FIG. 1A). The deflation vents 204 can be sized to maintain the columns in an inflated state prior to a vehicle impact and to exhaust the fluid within the columns upon the vehicle impact.

In such embodiments, a number of caps may be used to cover the vents 204. In such embodiments, upon impact, the covers could be designed to open or uncover a number of the vents 204.

In some embodiments, a number of flaps can be used to cover a number of the vents 204. As described above, the apparatus can include various types of vents on the inflatable members and/or the inflatable base and can include any suitable mechanism for venting an appropriate amount of fluid while inflated and/or while being deflated.

Figure 3A:
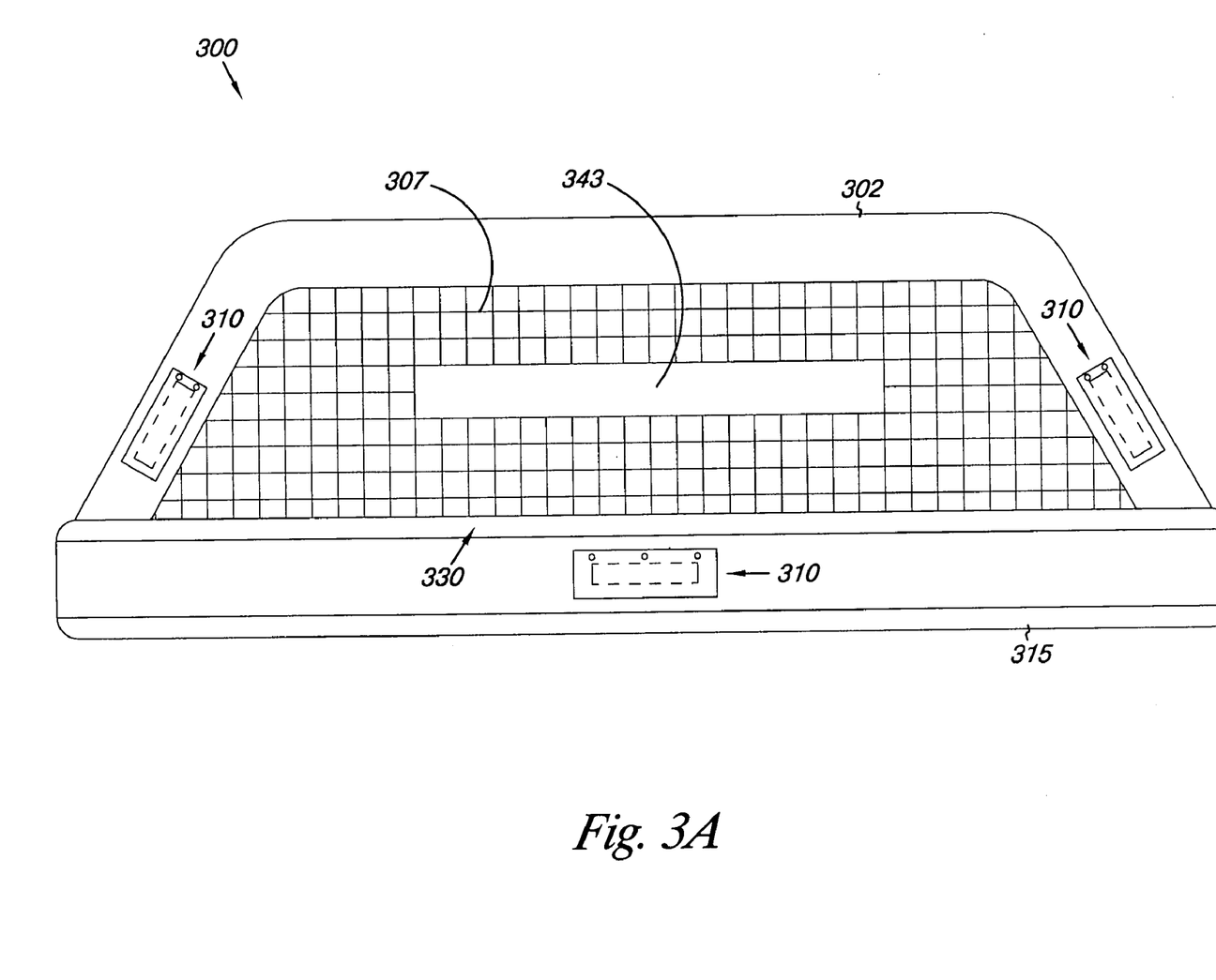
FIG. 3A illustrates a vehicle recovery apparatus according to an embodiment of the present disclosure.

FIG. 3A illustrates a vehicle recovery apparatus according to an embodiment of the present disclosure. In the embodiment illustrated in FIG. 3A, the apparatus 300 includes an inflatable member 302 that defines a portion of a vehicle target area 330.

The inflatable member 302 can be in fluid communication with an inflatable member 315 provided as an inflatable base. The apparatus 300 can be inflated by any suitable inflation source (e.g., via a source such as inflation source 120 shown in the embodiment of FIG. 1A).

In the embodiment illustrated in FIG. 3A, the apparatus 300 includes a number of deflation vents 310 located on member 302 and base 315. The fluid provided by the inflation source can be exhausted through a number of the deflation vents 310 while inflated and/or when a vehicle impacts the target area 330.

In the embodiment of FIG. 3A, the vents 310 can include a releasably attached flap covering an aperture of the apparatus (e.g., similar to vents 110-1 to 110-5 and/or 410 described in connection with the embodiments of FIGS. 1A, 4A, and 4B). However, as discussed previously, embodiments may include various other types of deflation vents and/or valves.

In the embodiment of FIG. 3A, the apparatus includes three vents. However, in some embodiments, the apparatus can include more or fewer than three vents. For instance, in some embodiments, the apparatus may include a single deflation vent which may be located on an inflatable member, including being located on an inflatable member provided as the inflatable base.

In the embodiment illustrated in FIG. 3A, the apparatus 300 includes netting 307 attached to the inflatable member 302 and the inflatable base 315. The netting can be used as a portion of the target area and can provide cushioning of the impact of the vehicle with the netting material.

The netting can also be flexible or loosely fitted, such that the netting can capture the vehicle with a portion of the netting material. In some embodiments, a vehicle impact to the netting 307 within target area 330 can cause the fluid within the apparatus to be exhausted through the number of deflation vents 310.

In some embodiments, the fluid within the apparatus 300 may not be exhausted until the vehicle impacts the base 315. For example, a vehicle can be arrested (e.g., its forward momentum can be stopped) by netting 307 and the fluid within the apparatus can be exhausted due to the weight of the vehicle once the vehicle impacts the base.

That is, the weight of the vehicle falling onto base 315 can increase the pressure therein such that a number of vents 310 opens to deflate the apparatus. In such embodiments, the base 315 can act as a cushion for the vehicle as the weight of the vehicle on the base causes deflation of the apparatus through a number of vents 310. As mentioned above, the netting 307 can include a capture component 343 that can releasably attach to a corresponding capture component on the impacting vehicle (e.g., capture component 141 of vehicle 105 shown in FIG. 1A).

Figure 3B:
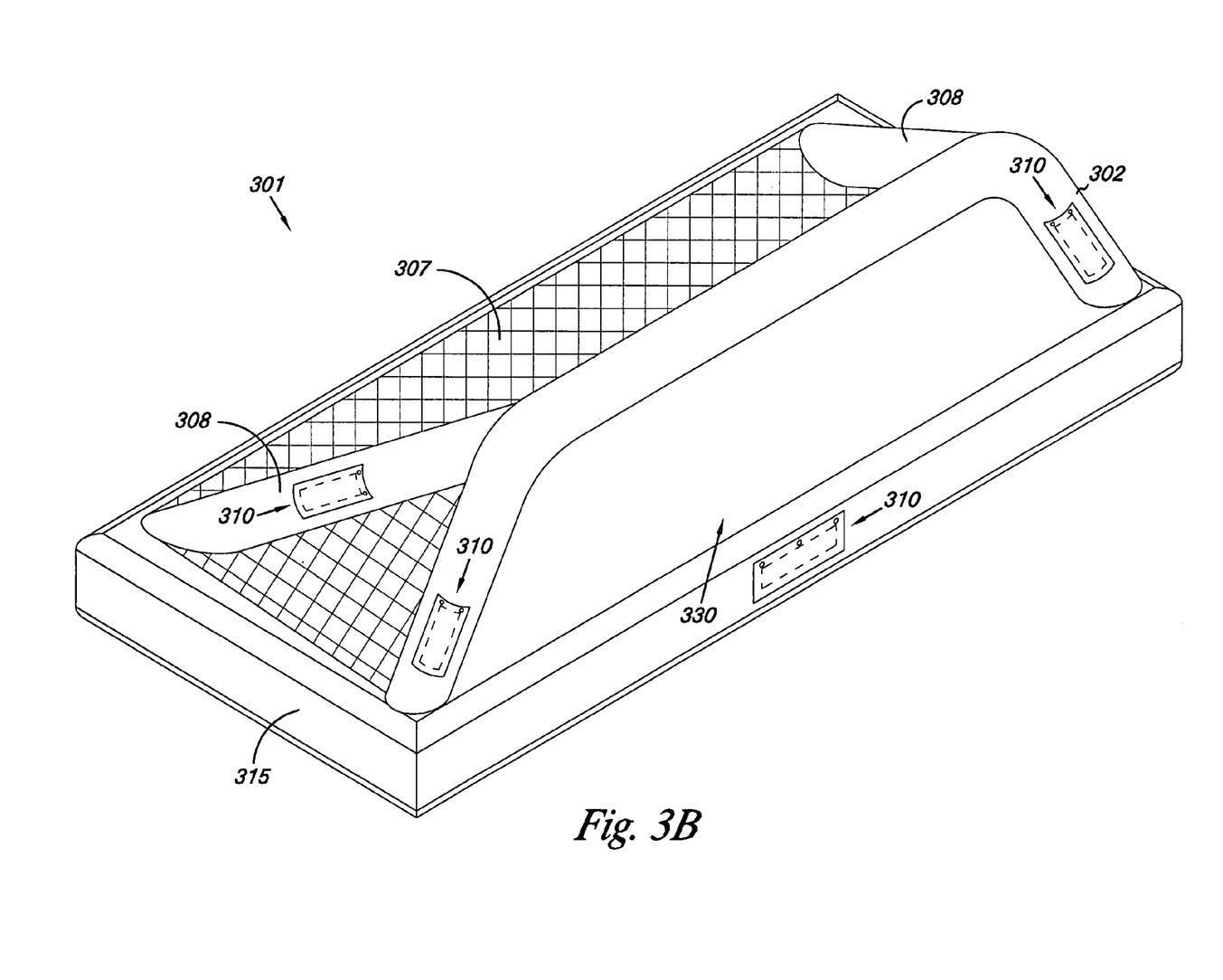
FIG. 3B illustrates a vehicle recovery apparatus according to an embodiment of the present disclosure.
Figure 3C:
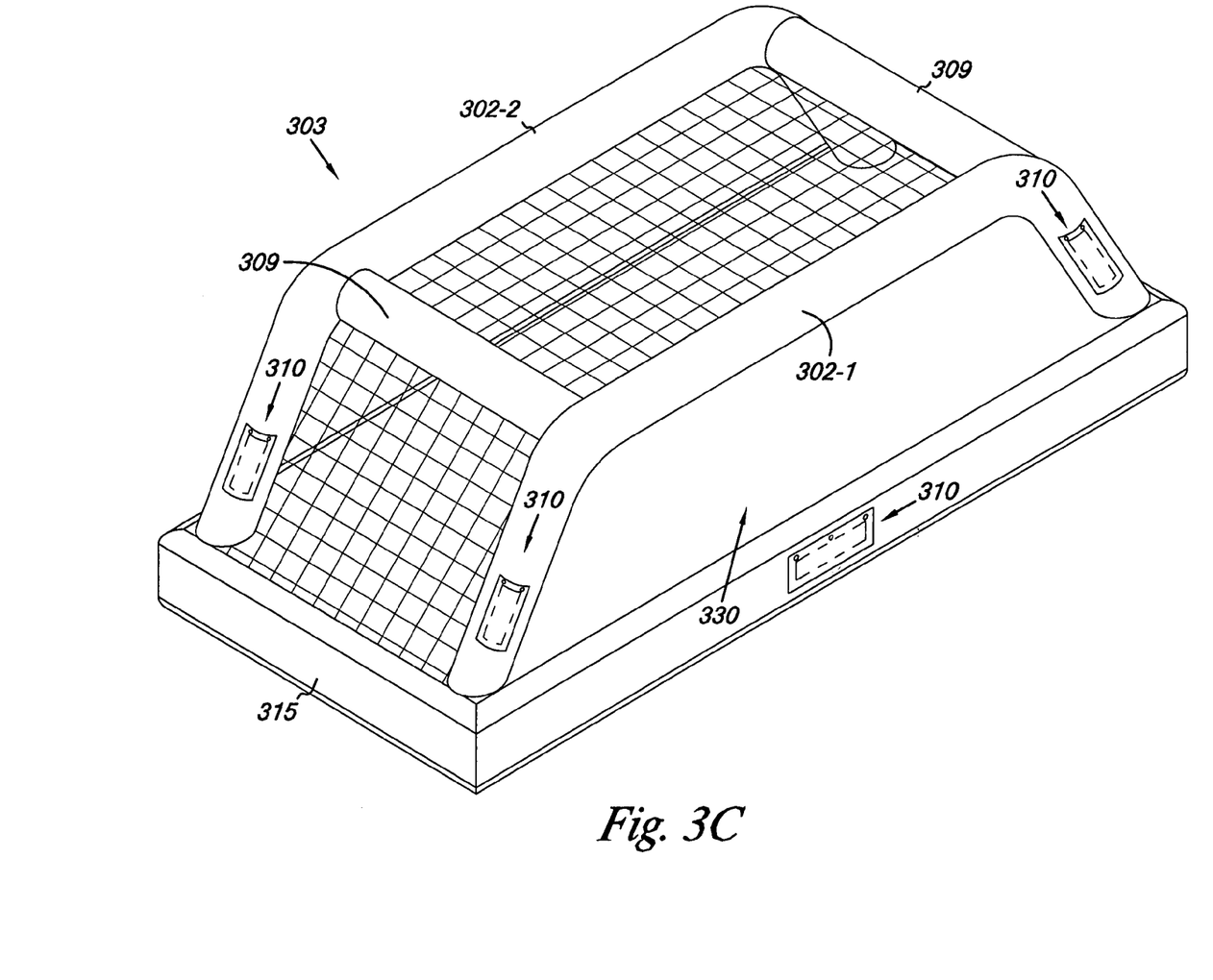
FIG. 3C illustrates a vehicle recovery apparatus according to an embodiment of the present disclosure.

FIG. 3B illustrates a vehicle recovery apparatus according to an embodiment of the present disclosure. FIG. 3C illustrates another vehicle recovery apparatus according to an embodiment of the present disclosure. The apparatus 301 of the embodiment of FIG. 3B and 303 of the embodiment of FIG. 3C are similar to the apparatus 300 described above in connection with FIG. 3A.

The apparatus 301 illustrated in FIG. 3B includes inflatable support members 308 attached to, and in fluid communication with, the inflatable member 302. In such embodiments, a number of the inflatable supports 308 and/or inflatable members 302 can include a number of deflation vents 310 through which the fluid in the apparatus 301 can be exhausted when a vehicle impacts target area 330. In the embodiment illustrated in FIG. 3B, the apparatus includes netting 307 attached to the inflatable member 302, to the inflatable supports 308, and to a base 315.

If an inflatable base is utilized, the inflatable base 315 can include a number of vents. In some embodiments, the inflatable base can be provided in a number of portions. In such embodiments, some, all, or none of the portions may be inflatable members.

The apparatus 303 illustrated in FIG. 3C includes two inflatable members 302-1 and 302-2 that define the target area 330 and that are in fluid communication with the inflatable base 315. In this embodiment, the apparatus 303 includes inflatable supports 309 attached between, and in fluid communication with, the inflatable members 302-1 and 302-2.

In such embodiments, a number of the inflatable members 302-1 and 302-2 and/or the inflatable base 315 can include a number of deflation vents 310 through which the fluid in the apparatus 303 can be exhausted when a vehicle impacts target area 330. In such embodiments, the apparatus can include netting 307 to arrest the vehicle to be recovered.

FIG. 4A illustrates an inflatable member 402 having a number of vents 404 and 410 according to an embodiment of the present disclosure. FIG. 4B illustrates the inflatable member 402 of FIG. 4A having a vent 410 in an open state according to an embodiment of the present disclosure.

In the embodiment illustrated in FIGS. 4A and 4B, the inflatable member 402 is a vertical inflatable column such as the vertical columns described in FIGS. 1A-1C and FIG. 2. However, the discussion of the deflation vents 404 and 410 can be applied to various types of vents that may be used on various inflatable members as described herein or otherwise. Additionally, although much of the discussion herein has been directed to vertical members forming the target area, other orientations, such as horizontal and/or diagonal can be utilized in various embodiments of the present disclosure.

In the embodiment of FIGS. 4A and 4B, the deflation vent 404 is an opening in the top of the column 402. The deflation vent 404 can be designed to be small enough to maintain the column in the inflated state prior to a vehicle impact and large enough to exhaust the fluid within column 402 rapidly upon the vehicle impact. That is, in this embodiment, the vent 404 remains in an open state before and after the vehicle impact.

In some embodiments, a number of the vents can be designed to open as the pressure within the inflatable member increases. In some embodiments, the opening of the vent can be gradual and, in various embodiments, the opening can be rapid.

In the embodiment illustrated in FIGS. 4A and 4B, the deflation vent 410 can be maintained in a closed state (FIG. 4A), and can be opened (FIG. 4B) to exhaust the fluid in the apparatus when a vehicle impacts the target area. In such embodiments, the deflation vent 410 includes a flap 414 releasably attached over an aperture 412 in column 402.

The flap 414 in an embodiment such as in FIGS. 4A and 4B can be releasably attached at attachment points 417. The flap can be releasably attached over the aperture at the attachment points, for example, by using hook and loop fasteners on opposing surfaces of the column and flap. A pressure increase due to a vehicle impact can force the release of flap 414 from attachment points 417 such that the fluid within the column can be exhausted through aperture 412.

In the embodiment shown in FIGS. 4A and 4B, one edge 413 of the flap 414 is not releasably attached to the column 402 such that the flap pivots around edge 413 when the vent 410 is opened (e.g., when the flap 414 releases from attachment points 417). In this way, the flap remains attached to the apparatus which can be beneficial in some instances.

Other suitable mechanisms for maintaining at least a partial attachment of the flap to the apparatus can be utilized. For example, a tether can be attached between the flap and the apparatus, among other structures.

Figure 5A:
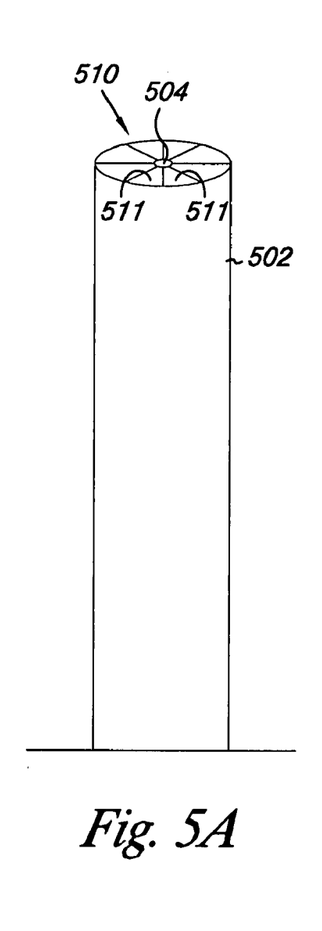
FIG. 5A illustrates an inflatable member having a vent in a closed state according to an embodiment of the present disclosure.
Figure 5B:
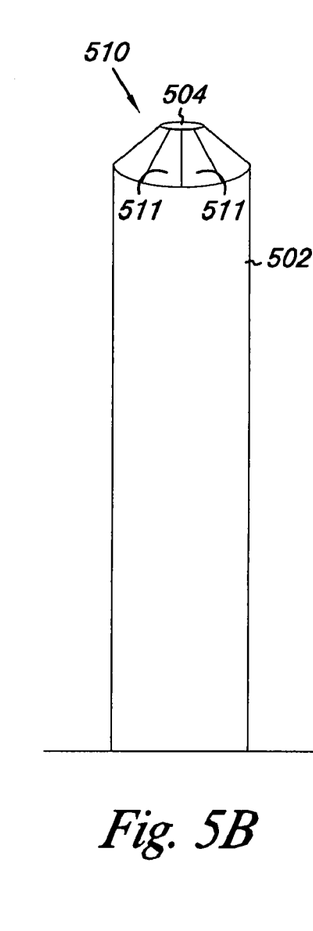
FIG. 5B illustrates the inflatable member of FIG. 5A having a vent in an open state according to an embodiment of the present disclosure.

FIG. 5A illustrates an inflatable member having a vent in a closed state according to an embodiment of the present disclosure. FIG. 5B illustrates the inflatable member of FIG. 5A having vent in an open state according to an embodiment of the present disclosure.

In the embodiment illustrated in FIGS. 5A and 5B, the inflatable member 502 is a vertical inflatable column similar to the vertical columns described in the embodiments of FIGS. 1A-1C and/or FIG. 2. However, the discussion of the deflation vent 510 can be applicable to similar vent types on various inflatable members as described herein or otherwise.

In such embodiments, the deflation vent 510 can include a number of panels 511 forming the top of column 502. In such embodiments, the vent 510 can include an opening 504 in the top of the column 502.

The opening 504 can be small enough to maintain the column in the inflated state prior to a vehicle impact. In some embodiments, the panels 511 of vent 510 can be configured such that there is little or no opening in the top of the inflatable member 502 (e.g., such that the top of column 502 is substantially sealed prior to a vehicle impact).

In the embodiment illustrated in FIGS. 5A and 5B, the deflation vent 510 can be maintained in a first state (FIG. 4A) prior to a vehicle impact and can be opened (FIG. 4B) to exhaust the fluid in the apparatus when a vehicle impacts the target area. That is, the pressure increase in the column 502 due to a vehicle impact thereto can be used to force fluid toward panels 511 causing them to spread apart which can enlarge opening 504 as shown in FIG. 5B.

In some embodiments, the enlarged opening 504 as shown in the embodiment of FIG. 5B can facilitate rapid exhaustion of the fluid within column 502 upon the vehicle impact. Various other vent and or valve types can be used to facilitate the exhaustion of fluid for embodiments according to the present disclosure.

Figure 6:
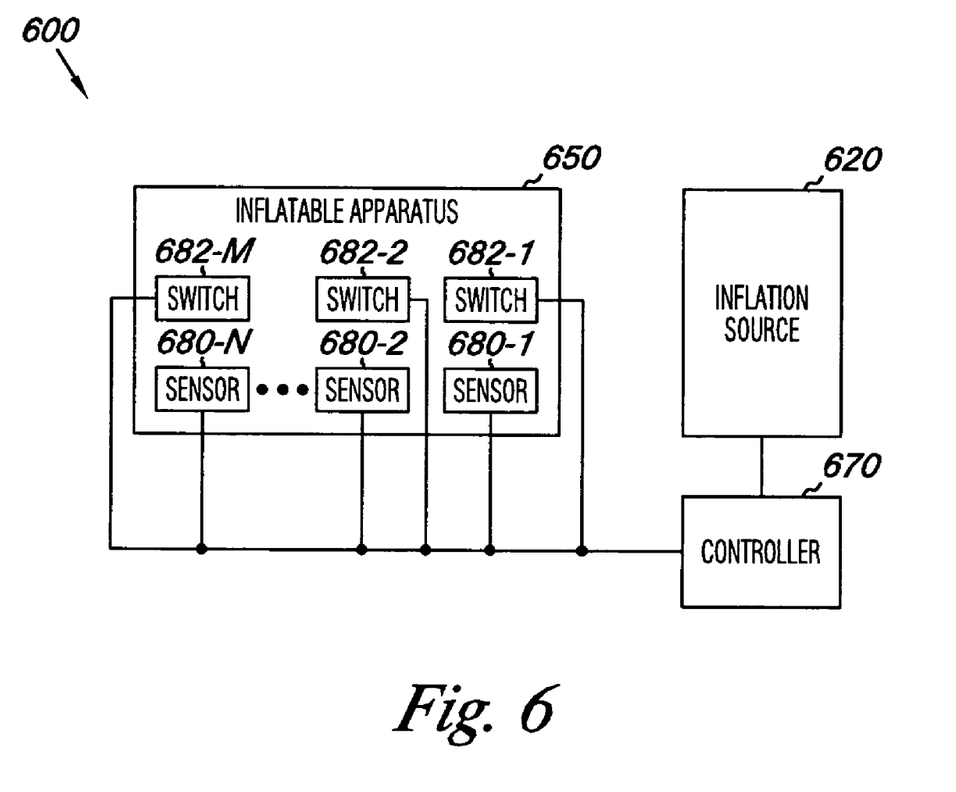
FIG. 6 is a block diagram of a system for vehicle recovery according to an embodiment of the present disclosure.

FIG. 6 is a block diagram of a system for vehicle recovery according to an embodiment of the present disclosure. In the embodiment illustrated in FIG. 6, the system 600 can include an inflatable apparatus 650.

The inflatable apparatus can, for example, be a vehicle recovery apparatus embodiment such as those described above in connection with FIGS. 1A-1C, 2, and/or 3A-3C. The system 600 can include an inflation source 620 to provide a fluid (e.g., gas) to apparatus 650.

In the embodiment illustrated in FIG. 6, the system includes a controller 670 coupled to the inflation source 620. The controller 670 can also be coupled to a number of sensors 680-1, 680-2, ..., 680-N and a number of switches 682-1, 682-2, ..., 682-M. The designators "M" and "N" are used to indicate that the system 600 can include a number of sensors and/or switches. In various embodiments, the controller 670 can monitor the switches and/or the sensors. In some embodiments, the controller 670 can control the operation of the inflation source 620 and/or a number of deflation vents/valves of apparatus 650 as described herein.

The switches 682-1 to 682-M can include various electronic and/or mechanical switches that can respond to various stimuli such as linear and/or rotational motion, pressure, or the presence of a magnetic field, among other stimuli. In various embodiments, a switch can be controlled by (e.g., respond to) an opening of a deflation vent (e.g., deflation vent 110-1 to 110-5 of FIG. 1A).

For instance, an electrical or mechanical switch can be coupled to a vent (e.g., deflation vent 104-1 to 104-5 and/or 110-1 to 110-5). In such embodiments, operation of the switch, such as opening and closing, can be based on the state of the vent (e.g., whether the vent is opened or closed).

In various embodiments, operation of the switch can control the inflation source (e.g., inflation source 120). Such functionality can be beneficial in some instances, such as to maintain the inflation of the inflatable members and/or to turn off the inflation source in order to deflate an inflatable member.

In some embodiments, the apparatus can include a number of pressure sensors on at least one of the number of inflatable members and/or on the inflatable base. In such embodiments, the opening or closing of a number of deflation vents can be based on a pressure change detected by the pressure sensor. For example, a detected rise in pressure (e.g., due to a vehicle impact) within a number of the inflatable members can trigger the opening of a number of deflation vents.

In some embodiments, netting (e.g., such as netting 307 of FIG. 3A) may be coupled to a number of sensors (e.g., sensor 680-1 to 680-N shown in FIG. 6) which can detect a vehicle impact to the netting. In such embodiments, the vents can be opened (e.g., via controller 670 shown in FIG. 6) due to a vehicle impact detected by the sensor.

In various embodiments, the inflation source can be controlled based on the pressure sensor information. For instance, the amount of fluid provided by the inflation source can be adjusted to maintain a particular pressure within the apparatus and/or a number of its inflatable members.

In such embodiments, a detected rise in pressure may also cause (e.g., via a controller) a shutdown of the inflation source. Shutting down the inflation source upon a detected pressure rise (e.g., a pressure spike due to a vehicle impact) can increase the speed at which the apparatus is deflated and can prevent damage to the vehicle being captured.

In such embodiments, the deflation vent can be opened due to a vehicle impact to apparatus 650 which causes an increased pressure in the apparatus that forces the deflation vent open. In such embodiments, the switch can change states (e.g., from "on" to "off" or vice versa) in response to the opening of the deflation vent.

A signal indicating the state change of the switch can be received by the controller 670, and the controller can perform functions to facilitate exhaustion of the fluid within the apparatus 650. For instance, the controller 670 can prevent further inflation of apparatus 650 by shutting the inflation source down when the signal indicating the state change of the switch is received.

This functionality can be accomplished by logic circuitry and/or a processor in which executable instructions can be executed to perform an action based upon information, for example, from the number of sensors. The executable instructions can be provided in memory or embedded in the circuitry of, for example, the controller.

The sensors 680-1, 680-2, ..., 680-N can include various types of sensors such as pressure sensors, motion sensors, and/or strain gauge sensors, among other types of sensors. As discussed above, in various embodiments, a number of sensors 680-1 to 680-N can be used to detect when a vehicle has impacted the apparatus 650 or the target area thereof.

For example, in various embodiments, a pressure sensor can be located on an inflatable member and/or an inflatable base of the apparatus 650 (e.g., a pressure sensor 680-1 can be located on an inflatable member of apparatus 650 and/or a pressure sensor 680-2 can be located on an inflatable base of the apparatus 650). In such embodiments, a vehicle impact to the apparatus can cause a pressure increase therein that can be detected by the pressure sensor.

The sensor information (e.g., a signal indicating a pressure spike) provided from the pressure sensor to the controller, can be used to control a number of deflation vents and/or inflation source 620. For instance, in various embodiments, the controller can, based on the detected pressure increase, shut the inflation source down and/or cause a number of deflation vents of apparatus 650 to be opened to facilitate rapid exhaustion of the fluid within the apparatus.

In some embodiments, a motion sensor or strain gauge sensor can be monitored by controller 670 to determine when a vehicle impact to apparatus 650 has occurred. For example, in various embodiments, the apparatus 650 includes netting attached that can be used to arrest a vehicle.

In such embodiments, a strain gauge sensor can be located on the netting and/or on an attachment point between the netting and an inflatable member. In such embodiments, an increased strain caused by a vehicle impact to the netting can be detected by the strain gauge and signaled to controller 670. Based on the detected strain, the controller can then take suitable actions to facilitate exhaustion of the fluid within apparatus 650 (e.g., opening deflation vents) turning off the inflation source, etc.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A vehicle recovery apparatus, comprising:
   at least two inflatable vertical members spaced a distance apart and having a target area for impact of a vehicle thereon;
   wherein the at least two inflatable members are inflated with a fluid provided by an inflation source and include air space therebetween; and
   wherein each of the at least two inflatable vertical members includes:
      a first type of deflation vent at a first end and configured to remain in an open condition; and
      a second type of deflation vent at a second end and configured to open upon impact of a vehicle with the target area, wherein the second type of deflation vent includes a flap releasably attached over an aperture of the inflatable member, and wherein the flap is released from the aperture to deflate at least a portion of the apparatus when the vehicle impacts the target area.

2. The apparatus of claim 1, wherein the apparatus includes an inflatable support attached to and in fluid communication with at least two inflatable members.

3. The apparatus of claim 1, wherein at least a portion of the target area is provided by a netting material.

4. A vehicle recovery apparatus, comprising:
   an inflatable base;
   a number of inflatable vertical columns having air space therebetween and in fluid communication with the inflatable base and defining a vehicle target area, wherein the number of inflatable columns and the inflatable base are inflated with a fluid provided by an inflation source;
   a number of deflation vents on the apparatus that open to exhaust the fluid in the apparatus due to a vehicle impact to the target area, wherein at least one of the number of deflation vents includes a flap releasably attached over an aperture of an inflatable column, and wherein the flap is released from the aperture to deflate at least a portion of the apparatus when the vehicle impacts the target area; and
   at least one deflation vent that is open prior to the vehicle impacting the target area and which remains open subsequent to the impact of the vehicle to the target area such that the fluid is vented while the apparatus is inflated.

5. The apparatus of claim 4, wherein at least one of the number of vertical columns includes a first deflation vent near a first end of the vertical column and a second deflation vent near a second end of the vertical column.

6. The apparatus of claim 4, wherein the number of vertical columns have a netting therebetween.

7. The apparatus of claim 4, wherein at least one of the number of inflatable columns includes an inflatable support attached thereto.

8. The apparatus of claim 4, wherein the flap is releasably attached over the aperture with at least one fastening mechanism from the group including:
   a hook and loop fastening mechanism; and
   a magnetic fastening mechanism.

9. The apparatus of claim 4, wherein the apparatus includes a switch controlled by at least one of the number of deflation vents, wherein operation of the switch controls the inflation source.

10. The apparatus of claim 4, wherein the apparatus includes a pressure sensor on at least one of:
    the inflatable base; and
    at least one of the number of inflatable columns; and
    wherein the opening of at least one of the number of deflation vents is based on a pressure change detected by the pressure sensor.

11. The apparatus of claim 4, wherein at least one of the number of inflatable columns includes a capture component to releasably attach with a corresponding component on an unmanned aerial vehicle.

12. A method for recovering a vehicle, comprising:
    providing a fluid to at least a portion of a vehicle recovery apparatus from an inflation source, the apparatus including:
       a number of inflatable members defining a target area;
       a number of vents configured to open to exhaust the fluid in the apparatus due to a vehicle impact to the target area, wherein at least one of the number of vents is located on a first end of at least one of the inflatable members, is configured to open upon impact of a vehicle with the target area, and includes a flap releasably attached over an aperture in the at least one inflatable member, and wherein the flap remains over the aperture until the vehicle impacts the target area and is released when the vehicle impacts the target;
       wherein the number of inflatable members are in fluid communication with an inflatable base and include air space therebetween; and
       wherein the at least one of the inflatable members includes a vent located on a second end of the at least one inflatable member, the vent configured to be open prior to the vehicle impacting the target area and which remains open subsequent to the impact of the vehicle to the target area such that the fluid is vented while the apparatus is inflated; and
    inflating the number of inflatable members with the fluid.

13. The method of claim 12, wherein the method includes:
    using the number of vents to maintain the number of inflatable members in an inflated state until a vehicle impact is received to the target area;
    receiving the vehicle impact to the target area; and
    exhausting, through the number of vents, the fluid provided by the inflation source when the vehicle impacts the target area.

14. The method of claim 13, wherein at least one of the number of vents includes an aperture in at least one the number of inflatable members, and wherein using the number of vents to maintain the number of inflatable members in the inflated state includes maintaining the aperture of the at least one of the number of inflatable members in a closed state until the vehicle impacts the target area.

15. The method of claim 14, wherein receiving the vehicle impact to the target area increases a pressure in the at least one of the number of inflatable members, and wherein the increased pressure forces the aperture to an open state.

16. The method of claim 12, wherein the method includes opening the at least one of the number of vents configured to open upon impact of a vehicle with the target area based on sensor information provided by a sensor of the apparatus.

17. The method of claim 16, wherein the method includes controlling the inflation source based on the sensor information provided by the sensor.

18. The method of claim 16, wherein the sensor is a pressure sensor that senses the pressure within at least one of the number of inflatable members, and wherein the method includes opening the at least one of the number of vents configured to open upon impact of a vehicle with the target area based on the sensor information.

19. The method of claim 16, wherein the number of inflatable members includes a number of inflatable columns spaced a distance apart, and wherein the exhausting includes collapsing at least one of the inflatable columns around the vehicle as the fluid therein is exhausted.

20. The method of claim 12, wherein receiving the vehicle impact to the target area includes using a first capture component located on the target area and a second capture component located on the vehicle.

21. The method of claim 20, wherein using the first and the second capture component includes using a first capture component that includes a hook and loop fastener attached to the target area and using a second capture component that includes a corresponding hook and loop fastener attached to the vehicle.

* * * * *